United States Patent [19]

Cohn et al.

[11] Patent Number: 4,880,978

[45] Date of Patent: Nov. 14, 1989

[54] RESONANT RADIATION PROTECTOR

[75] Inventors: David B. Cohn, Torrance; Gregory R. Sasaki, Long Beach, both of Calif.

[73] Assignee: Hughes Aircraft Company, Los Angeles, Calif.

[21] Appl. No.: 275,878

[22] Filed: Nov. 25, 1988

[51] Int. Cl.⁴ .............................................. H01L 25/00
[52] U.S. Cl. .................................................... 250/332
[58] Field of Search ................ 250/332; 350/266, 269, 350/354; 358/113

[56] References Cited

U.S. PATENT DOCUMENTS 4,262,198  4/1981  Gupta et al. ........................ 250/332

*Primary Examiner*—Janice A. Howell
*Assistant Examiner*—T. Nguyen
*Attorney, Agent, or Firm*—William J. Streeter; Wanda K. Denson-Low

[57] ABSTRACT

In an imaging system employing an array of detectors and an optical system for focusing rays of an image upon the detectors, there is provided a protection system in the form of a cell of gaseous lasing material disposed along a path of the imaging rays. A pair of electrodes and a supply of electric power induces an electric discharge through the lasing medium to heat the medium so as to enhance interaction between intense laser radiation which might inadvertently or deliberately, be directed toward the array of detectors. The laser radiation induces still further heating of the lasing medium with a resultant absorption of a relatively narrow frequency band of radiation, at the lasing frequency, so as to prevent damage to the array of detectors while allowing scene radiation outside of the narrow band to be received by the detectors. A further detector may be located offset from a path of propagation of the laser radiation for decting fluorescent rays produced by interaction of the laser radiation with the lasing medium. If desired, a shutter activated by a signal of the further fluorescent detector may be employed to provide additional protection of the array of detectors from the laser radiation.

14 Claims, 2 Drawing Sheets

RESONANT RADIATION PROTECTOR

BACKGROUND OF THE INVENTION

This invention relates to the protection of radiation receiving devices from damage by an incident beam of radiation of excessive intensity and, more particularly, to a protection system employing a chamber of gaseous material with raised energy states, and located on a path of radiation propagation, for absorption of excess incident radiation power.

Radiation receiving devices are employed in a variety of situations. Of particular interest are receiving devices employed in the imaging of scenes emitting radiation such as infrared radiation. An infrared imaging system employs, typically, an array of radiation sensitive detectors which view incoming radiation via an optical focusing system including a scanning mirror. The detectors output signals in response to the incident radiation, the detector signals being employed by well-known signal processing circuitry to produce an image of the scene upon a display for viewing by persons operating the infrared imaging system.

Radiation detectors, of the type employed in an array of detectors may be fabricated of semiconductor material which is susceptible to damage, as by heating, when exposed to excessively strong radiation. For example, a laser beam which might be directed inadvertently or deliberately toward the receiving optics of an imaging system could inflict significant damage to the radiation detectors so as to disable the detectors.

Such detectors, or sensors of radiation, are found in laser rangefinders, radars, and passive receiving systems such as the aforementioned imaging system. The receiving systems employ receiving telescopes which may have a relatively large field of view and a large acceptance angle through which laser radiation may be received. In the case of an active device, such as a laser rangefinder, it is intended that the receiving telescope receive laser radiation. However, in the case of a passive infrared imaging system, it is intended that only scene radiation be incident upon the receiving telescope even though the telescope is responsive to laser radiation at the infrared frequencies.

The laser radiation can be at a variety of wavelengths, and may be pulsed or continuous wave. In order to protect a receiving device from excessively strong laser radiation, a fast-operating optical switch is desired to close the optical path in the presence of the strong radiation, which switch must allow the normal intensity radiation to pass without interference through the optical system to the detectors. Such an optical switch must be activated almost instantaneously, prior to the damaging of the detectors, to block or greatly reduce the transmission of strong laser radiation. Ideally, such an optical switch should protect against a broad band of laser wavelengths, and be operative over a wide field of view.

Detectors or sensors of infrared radiation utilized in imaging systems operate typically over narrow bands of radiation, on the order of several microns, and are susceptible to damage by high energy radiation such as that emitted by lasers operating within the receiving band of the detectors. The use of conventional fixed absorbing or reflecting filters with relatively large effective bandwidths is usually precluded in the case of multiline incident laser radiation. The ineffective protection offered by the filters results because protection against all possible laser wavelengths would require the use of an excessively large number of filters which would reduce excessively the sensor radiation passband.

One attempt to provide suitable protection of an array of detectors against excessively powerful radiation has been the use of a resonant gaseous absorption chamber disposed along the path of radiation propagation. As an example of the gas absorption process, pulse shaping has been employed with radiation from a carbon dioxide laser by passage of the radiation through a saturable absorber gaseous material such as sulphur hexafluoride.

However, a problem exists in that such saturable absorbing material has not been adequately effective in reducing a strong beam of radiation to extinction. The problem arises because presently available devices do not produce enough numerical density of molecules in a resonant state for interaction with the incident radiation. Therefore, presently available resonant-gas absorbers do not provide adequate protection against intense radiation, and are limited to specific wavelengths (usually one wavelength) wherein threats of damaging radiation may or may not operate.

SUMMARY OF THE INVENTION

The foregoing problem is overcome and other advantages are provided by a receiving system, such as an infrared imaging system having an array of radiation detectors and an optical system for directing radiation from a scene to the array of detectors; and wherein, in accordance with the invention, a radiation protection system comprising a cell of a radiation absorptive gas is installed within the optical system.

The invention provides protection against intense laser radiation by the use of one or more extremely narrow absorbing filters operative at the laser wavelengths. Such a narrow filter can be attained by the use of gas molecular resonance which produces band-reject filters which can be several orders of magnitude narrower than conventional fixed filters employing electromagnetic resonators. Compared to fixed filters, gas resonance absorption enables filters to operate over wide fields of view, and provides the further advantage of being self-healing at high power levels. This avoids the hazard of damage in fixed filters from excessively intense radiation, the damage threshold in fixed filters being a recurring problem.

In the use of resonant gas absorption to limit laser power, a major consideration is obtaining sufficiently large molecular number densities in the absorbing states of the gas so as to obtain significant absorption of the unwanted laser power. The invention attains the requisite large molecular number densities by use of gases that are normally resonant but weakly absorbing. The protection system of the invention includes a cell or chamber having windows transparent to scene radiation as well as to the unwanted interfering high-intensity laser radiation, the cell being filled with a gas such as hydrogen fluoride, deuterium fluoride, or carbon monoxide. A specific one of these gases is selected in accordance with the frequency of laser radiation which is to be absorbed. This use of laser gas to absorb laser radiation is known to work only with he specific types of gases. If the unwanted radiation is produced by a hydrogen fluoride laser, then hydrogen fluoride gas is used in the cell. Similarly, if deuterium fluoride or carbon monoxide gas is employed in the laser, then deuterium fluoride or carbon monoxide gas, respectively, is employed in the cell.

The invention provides for the emplacement of electrodes within the cell to establish a low energy plasma discharge which heats the gas to provide the vibrational distribution of gas molecules associated with a heated gas, the heated gas vibrational distribution greatly enhancing absorption of the laser radiation. This is useful for some molecules and lasers such as carbon monoxide. It is not needed with hydrogen-fluoride molecules and hydrogen-fluoride lasers. The plasma discharge initiates absorption of the laser radiation. After the initiation of absorption, further heating of the gas is attained by the absorption of energy from laser radiation, this further heating acting as a feedback mechanism to increase still further the absorption of laser power by the gas. While the cell may be placed at any point within the path of radiation, it is particularly advantageous to locate the cell at a focal point in the radiation path so as to accentuate the heating by absorption of laser radiation and enhance the feedback mechanism so that the cell effectively cuts off the laser radiation. If two laser beams of different frequencies are present, then two of the foregoing cells may be employed in series along the optical path for extinguishing beams of both lasers, one cell having one of the foregoing gases and the other cell having another of the foregoing gases. The gas absorption filter of the invention is amenable to wide field of view sensors, provides short rise time protection without the need for prior detection of the laser threat, and has an optimally large passband for scene radiation. Yet another advantage of the gas filled cell is that the cell is suitable for use as a sensitive radiation detector with a very high damage threshold.

BRIEF DESCRIPTION OF THE DRAWING

The aforementioned aspects and other features of the invention are explained in the following description, taken in connection with the accompanying drawing wherein.

DETAILED DESCRIPTION

Figure 1:
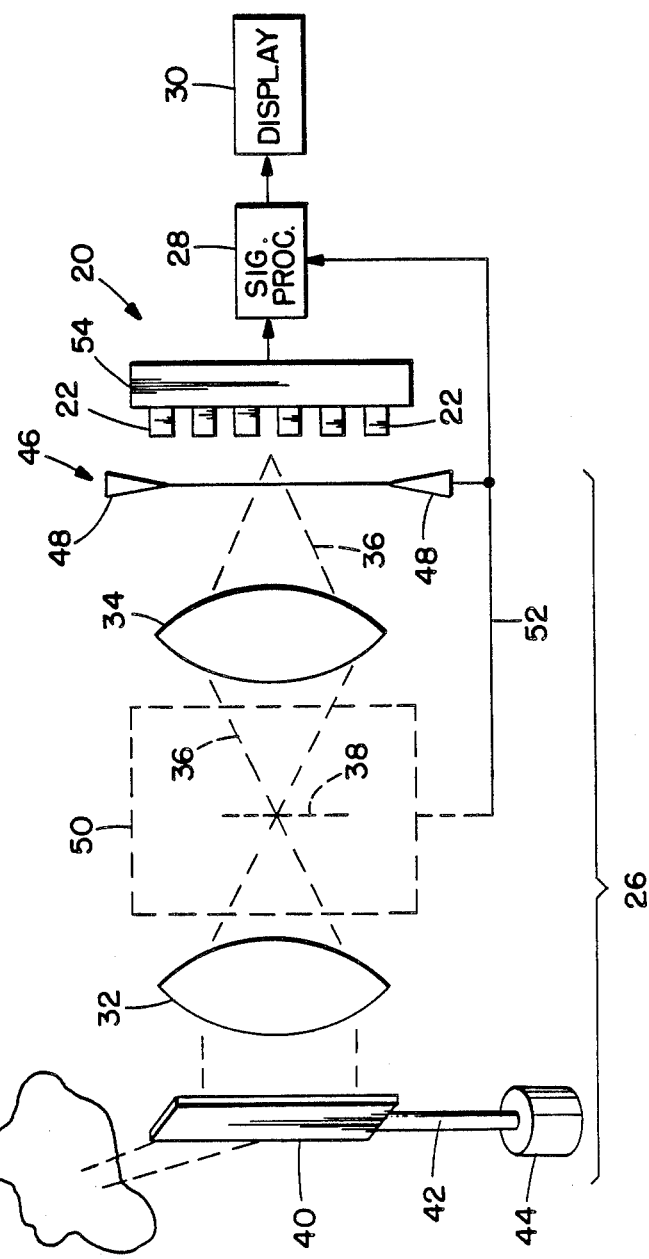
FIG. 1 is a diagrammatic view of an imaging system incorporating a radiation protection system according to the invention.

In FIG. 1, there is shown an imaging system 20 including an array of detectors 22 for detecting radiation, such as infrared radiation emanating from a scene 24 and directed by an optical system 26 from the scene 24 to the detectors 22. The detectors may be arranged in a linear array or in an array composed of a matrix of rows and columns. The detectors 22 output electric signals to a signal processor 28, in response to radiation incident upon the detectors 22, the processor 28 employing well known circuitry for converting the detector signals into an image of the scene 24. The image is presented on a display 30 connected to an output terminal of the processor 28.

By way of example, the optical system 26 comprises a first lens 32 and a second lens 34 for focusing rays 36 of the radiation emanating from the scene 24 upon the detectors 22. Typically, the detectors 22 are arranged along a planar surface, the lenses 32 and 34 producing a real image of the scene 24 upon the planar surface of the detectors 22. In addition, the first lens 32 produces an intermediate real image at a focal plane 38 between the two lenses 32 and 34, the rays 36 continuing through the focal plane 38 to be reimaged by the second lens 34 upon the planar surface of the detectors 22.

A scanning of the scene 24 is provided by use of a mirror 40 rotatably mounted on a shaft 42, the shaft 42 connecting the mirror 40 to a rotator 44 which rotates the mirror 40 in response to electric drive signals applied to the rotator 44 by the signal processor 28. By activating the rotator 44 with signals provided by the processor 28, rotation of the mirror 40 is synchronized to signal processing operations performed by the processor 28. Rays 36 propagating from the scene 24 are reflected by the mirror 40 to pass through the lenses 32 and 34. A protective mechanical shutter 46 having blades 48 is deployed behind the second lens 34 to block incident radiation having excessively high power so as to protect the detectors 22 from a possibility of damage by excessively powerful radiation.

In accordance with the invention, the system 20 is provided with a radiation protection system 50 which is located within the optical system 26. The protection system 50 is to be deployed along a path of propagation of the radiation rays 36, so as to be responsive to the intensity of the radiation, and so as to intercept the radiation to protect the detectors 22. An output signal of the protection system 50 is applied via line 52 to the shutter 46 for closing the blades 48, thereby to shield the detectors 22 from the damaging effects of excessively powerful radiation.

For the detection of infrared radiation, the detectors 22 may be mounted within a cryogenic chamber (not shown) for cooling and maintaining the detectors 22 at a suitably low temperature for their operation. The portrayal of the system 20 in FIG. 1 has been simplified to show only those components of the system 20 necessary for an understanding of the invention. Accordingly, the detectors 22 are shown simply as being mounted on a support 54, which support lies along the planar surface, and includes electrical conductors, and/or well-known multiplexing circuitry (not shown) for connecting the signals of respective ones of the detectors 22 to the signal processor 28.

Figure 2:
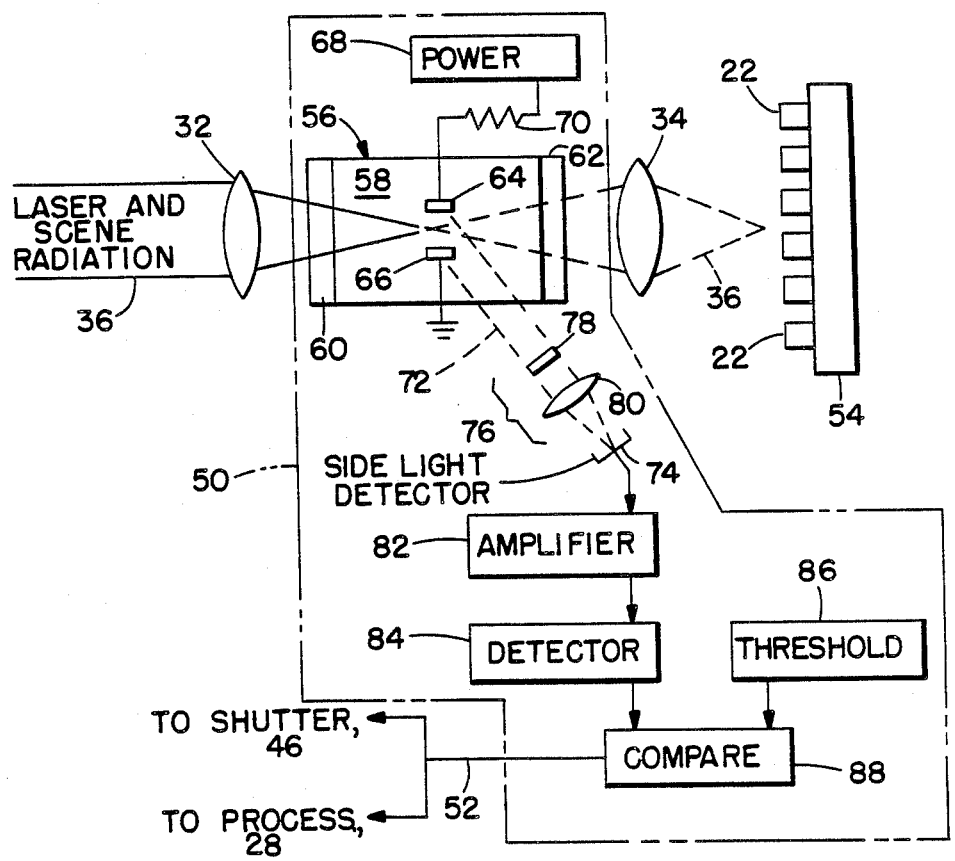
FIG. 2 is a schematic drawing of the radiation protection system, including a cell of a radiation absorptive gas, of FIG. 1.

FIG. 2 shows details in the construction of the protection system 50 of FIG. 1. The protection system 50 comprises a cell 56 of a radiation absorptive gas 58 disposed along the path of propagation of the radiation rays 36. The cell 56 is hermetically sealed so as to contain the gas 58 under pressure, and includes windows 60 and 62, respectively, at input and output ends of the cell 56 to allow propagation of the rays 36 through the cell 56. The radiation propagating through the cell 56 varies in intensity as a function of location within the cell 56, a higher radiation intensity being obtained at the intermediate focal plane 38 (FIG. 1) where a focusing of the rays 36 occurs. A pair of electrodes 64 and 66 are located within the cell 56 at a location of the higher radiation intensity. The electrodes 64 and 66 are spaced apart with a gap for the generation of an arc, electric power for generating the arc being provided by a DC power supply 68 having an output terminal serially connected via a resistor 70 to the electrode 64. The electrode 66 is connected via ground to a return terminal of the supply 68. By way of example, the electrodes 64 and 66 may be positioned along the intermediate focal plane 38 (FIG. 1) for generating an arc parallel to the plane 38.

During operation of the cell 56, gas molecules which have been excited by the arc to a higher energy state may interact with the incident radiation to generate fluorescent radiation represented by rays 72. The fluorescent radiation becomes most noticeable at higher values of incident radiation power, and is less noticeable at lower values of incident radiation power.

A feature of the invention is the detection of the fluorescent radiation so as to determine the presence of unwanted high power radiation which may damage the detectors 22. The protection system comprises a detector 74 of the fluorescent radiation, and an optical system 76 comprising a filter 78 and a lens 80 for capturing the fluorescent radiation and directing the fluorescent radiation to the detector 74. The protection system 50 further comprises electrical circuitry coupled to an output terminal of the detector 74, the electrical circuitry including an amplifier 82, a detector 84, a source 86 of a threshold reference signal and a comparator 88 coupled to output terminals of the detector 84 and the source 86 for comparing a signal outputted by the detector 84 with the reference signal of the source 86.

In operation, the detector 74 outputs an electric signal in response to fluorescent radiation incident upon the detector 74. The output signal of the detector 74 is coupled via the amplifier 82 to the detector 84, the amplifier 82 amplifying the signal to a suitable power level for detection by the detector 84. The comparator 88 outputs a signal on line 5 based on a comparison of the signal outputted by the detector 84 and the source 86. The signal on line 52 has a relatively low value, a logic-0 state, when the fluorescent radiation is relatively low. The signal on line 52 has a relatively high value, a logic-1 state, when the fluorescent radiation is relatively high. The magnitude of the threshold reference signal is set at a sufficiently low value to provide for a shutter activation signal on line 52, this being the logic-1 state, for operating the shutter 46 (FIG. 1) during intervals of time when the incident radiation rays 36 have dangerously high power which may damage the detectors 22. The magnitude of the threshold reference signal is high enough so as to allow normal operation of the imaging system 20 without interruption by the shutter 46 for normal values of radiation intensity incident upon the first lens 32. The activation signal on line 52 is also applied (as shown in FIG. 1) to the signal processor 28 to indicate that no additional imaging data is being provided due to a closure of the shutter blades 48. Since the cell 56 operates to remove unwanted laser radiation, the shutter 46 need be operated only as a backup protector in cases of unusually high laser radiation intensity. At lower levels of unwanted laser radiation, the imaging process can continue without activation of the shutter 46 because the cell 56 absorbs the laser radiation.

In operation, the gas 58 of the cell 56 is selected in accordance with the frequency of radiation of an incoming laser beam, which laser beam interferes with the reception of radiation from the scene 24 (FIG. 1). For example, if the unwanted laser beam is recognized as being the beam produced by a carbon monoxide laser, then the gas 58 is carbon monoxide. Similarly, if the laser beam is known to be the beam of a hydrogen fluoride or deuterium fluoride laser, then the gas 58 is, respectively, hydrogen fluoride or deuterium fluoride. These gases are provided by way of example, it being understood that the theory of the invention is applicable to the use of other gases which are known to be employed as a lasing medium for the generation of laser beams. It is necessary, however, that lasing occur among relatively low-lying molecular levels so as to introduce resonance with the low-lying resonant absorption levels.

The power supply 68 employs well-known circuitry for providing current at an output voltage of approximately 25,000 volts. This value of voltage is sufficient to produce a plasma discharge in the gas 58 between the electrodes 64 and 66. The resistor 70 is connected in series between the power supply 68 and the electrodes 64 so that current flowing from the supply 68 through the plasma discharge produces a voltage drop across the resistor 70. The resistor 70 allows full voltage of the power supply 68 to appear across the electrode 64 and 66 to initiate the plasma discharge and then, after current begins to flow through the plasma, the resistor 70 provides a voltage drop which reduces current flow from the supply 68 through the plasma so as to attain a desired low energy discharge. The plasma discharge is of sufficiently low power so as to offer no significant interference with the imaging of rays 36 from the scene 24, nor to trigger the detector 84 in the detection of fluorescent radiation. However, sufficient current flows from the supply 68 through the plasma discharge to heat gas molecules between the electrodes 64 and 66 sufficiently so as to make them more amenable to the absorption of the laser radiation.

With the appearance of the laser beam, there is sustained an enhanced heating of the gas 58 by the intense laser optical field. The enhanced heating raises the absorptive capacity of the gas for absorbing radiation from the heating. The initial heating by current from the supply 68 may be regarded as a trigger, and the latter heating by the laser beam may be likened to a feedback mechanism. The increased heating by the laser beam increases the absorptive properties of the gas resulting in still further absorption of the power of the laser beam until the laser beam is extinguished so as to allow the detectors 22 to function without interference of the laser beam. During interaction of the laser beam with the gas 58, the fluorescent radiation is emitted and is detected by the detector 74. This provides an additional feature to the invention in which the detector 74 may be regarded as a sidelight detector located at a point of safety away from the path of propagation of the laser beam. As a result, the sidelight detector is readily employed to detect the presence of an intense laser beam while having a high damage threshold.

Figure 3:
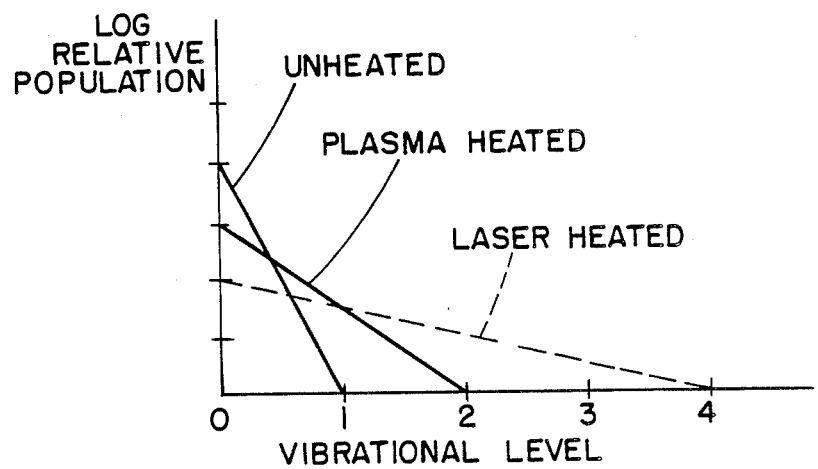
FIG. 3 is a graph showing population densities of molecules of the gas in the cell of FIG. 2 as a function of energy level.

With reference to FIG. 3, the physical process basic to the operation of the cell 56 can be explained further. The relative population distribution in a typical gas is shown as a function of vibrational energy level for various temperatures. The unheated molecular distribution occupies primarily the ground state, and incoming laser radiation which is resonant at higher levels interact very little with the gas. Heating by a plasma discharge increases the temperature and populates higher energy levels so that laser radiation then experiences absorption. If the laser radiation is sufficiently intense, further heating from the optical field takes place leading to increased absorption, thus to act as a feedback mechanism.

The distribution shown in FIG. 3 is characteristic of the deuterium-fluoride gas and the carbon monoxide gas, including their respective laser systems. In the case of the deuterium fluoride, or the hydrogen fluoride system, the effect of heating is pronounced because these lasers operate on a transition in valence (V) bands from V=1 to V=0, and V=2 to V=1 for which band transitions, gas populations would be high at low temperatures. For the carbon monoxide system, the laser operates on higher energy bands, such as the transition from V=4 to V=3 so that heating would be required. It is particularly advantageous that this process occurs rapidly, and does not need any predetection of the radiation to activate the cell. Thus, the rise time of the power limiting characteristic of the cell 56 would be essentially instantaneous from moderate power levels, and would be on the order of molecular redistribution times for higher levels.

In the operation of the cell 56, it is noted that the detectors 22 absorb radiation across the full band bands of radiation being viewed from the scene 24, this including the bands of radiation absorbed by the very narrow band rejected by the filter action of the cell 56. During operation of the cell 56 to absorb radiation from the unwanted laser beam, there is also loss of scene radiation within the reject band, or absorption band, of the cell 56. However, this loss of scene radiation is negligible when compared to the overall spectrum of received scene radiation. In the construction of the cell 56, a cell length of 10 centimeters is employed in the case of deuterium fluoride gas, whereas, in the case of carbon monoxide gas, a cell length of one meter is effective. The latter length can be reduced, if desired, by use of folding optics in conjunction with the cell. Energy absorbed from the incident radiation is dissipated as heat within the gas lasing medium, the heat from the gas lasing medium being conducted away from the medium by walls of the cell. Also, it is noted that the teachings of the invention are applicable to lasing media other than those disclosed herein through which electric current can be transmitted for raising the population density of energy states with which incident radiation can interact so as to transfer energy from the radiation to the medium in the form of heat.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A radiation filter comprising:
   a cell having windows transparent to radiation;
   lasing material disposed within said cell; and
   electrode means including electrodes for conducting electric current through the lasing material, the electric current raising the population density of higher energy states in the lasing medium to initiate interaction of the radiation with the lasing medium, thereby to absorb radiation within a frequency band of resonance of the lasing material, the filter being transparent to a band of radiation outside said resonant band.

2. A filter according to claim 1 further comprising means for focusing radiation at a location between said electrodes so as to heat the lasing medium in addition to a heating provided by said electric current, thereby to induce a feedback mechanism for enhanced absorption of energy from said radiation in said band of resonance.

3. A filter according to claim 2 wherein said lasing medium is a gas.

4. A filter according to claim 3 wherein the gas of said lasing medium is hydrogen fluoride, deuterium fluoride, or carbon monoxide.

5. A detector of fluorescent radiation comprising:
   a cell having windows transparent to incident radiation;
   lasing material disposed within said cell;
   means for directing rays of the incident radiation along a path through said windows;
   electrode means including electrodes for conducting electric current through the lasing material, the electric current raising the population density of higher energy states in the lasing medium to initiate interaction of the incident radiation with the lasing medium to convert the incident radiation to fluorescent radiation; and
   a detector offset from said radiation path for detecting said fluorescent radiation.

6. A detector according to claim 5 further comprising focusing optics disposed in front of said detector for directing rays of said fluorescent radiation towards said detector.

7. A detector according to claim 6 wherein said lasing medium is a gas.

8. A detector according to claim 7 wherein said gas is hydrogen fluoride, deuterium fluoride, or carbon monoxide.

9. An imaging system comprising an array of detectors for viewing scene radiation emitted by a scene;
   focusing optics for directing rays of the scene radiation to image upon said array of detectors;
   means coupled to output terminals of said detectors for combining signals of said detectors to provide an image of said scene;
   a cell disposed in said focusing optics, said cell having windows transparent to the scene radiation, said cell providing protection from laser radiation lying within a frequency band of said scene radiation;
   lasing material within said cell;
   electrode means including electrodes for conducting electric current through the lasing material, the electric current raising the population density of higher energy states in the lasing medium to initiate interaction of the laser radiation with the lasing medium, thereby to absorb the laser radiation to protect said detectors from said laser radiation, the cell being transparent to scene radiation lying outside a resonant frequency band of said lasing medium.

10. A system according to claim 9 wherein said focusing optics provides an intermediate focus in addition to a focusing of said scene radiation upon said array of detectors, and wherein said lasing medium and said electrodes are disposed in a focal plane of said intermediate focus for enhanced heating of said lasing medium in addition to heating provided by said electric current, thereby to induce a feedback mechanism for enhanced absorption of energy from said radiation in said band of resonance.

11. A system according to claim 10 wherein said lasing medium is a gas and wherein said gas is hydrogen fluoride, deuterium fluoride, or carbon monoxide.

12. An imaging system comprising an array of detectors for viewing scene radiation emitted by a scene;
   focusing optics for directing rays of the scene radiation to image upon said array of detectors;

means coupled to output terminals of said detectors for combining signals of said detectors to provide an image of said scene;

shutter means optically coupled to said focusing optics for protection of said detectors from laser radiation lying within a frequency band of the scene radiation, said shutter means terminating propagation of said laser radiation from said focusing optics to said array of detectors;

a cell having windows transparent to the scene radiation;

lasing material disposed within said cell, said focusing optics directing rays of said scene radiation and rays of said laser radiation along a path through said windows;

electrode means including electrodes for converting said laser radiation to fluorescent radiation; and a further detector offset from said radiation path for detecting said fluorescent radiation, an output signal of said fluorescent detector being connected to said shutter means for activating said shutter means to terminate propagation of said laser radiation to said array of detectors.

13. A system according to claim 12 further comprising means disposed between said electrodes and said detector of fluorescent detector for directing rays of said fluorescent radiation away from said radiation path toward said fluorescent detector, the offsetting of said fluorescent detector from said radiation path protecting said fluorescent detector from power of said laser radiation.

14. A system according to claim 13 wherein said lasing medium is a gas and wherein said gas is hydrogen fluoride, deuterium fluoride, or carbon monoxide.

* * * * *